United States Patent [19]

Mandlak

[11] 4,146,296

[45] Mar. 27, 1979

[54] VIEWING APPARATUS EMPLOYING TRANSPARENT VIEWING SCREEN

[76] Inventor: Louis J. Mandlak, 116 Athenia Dr., Fort Worth, Tex. 76114

[21] Appl. No.: 846,640

[22] Filed: Oct. 31, 1977

[51] Int. Cl.² ............................................. G02B 23/02
[52] U.S. Cl. ........................................ 350/9; 350/25; 350/49
[58] Field of Search .................. 350/9, 25, 26, 27, 48, 350/49, 52–55, 291, 301, 302, 307, 296

[56] References Cited

FOREIGN PATENT DOCUMENTS 796406 6/1958 United Kingdom ...................... 350/26

*Primary Examiner*—Jon W. Henry
*Attorney, Agent, or Firm*—Wofford, Fails and Zobal

[57] ABSTRACT

Apparatus for viewing a predetermined sector; such as, the right hand rearward side of an automobile by way of a right rear view mirror; via an altered reflection characterized by a first lens for reducing and inverting the view from the right rear view mirror; a second lens for righting the inverted view; small tubular housing enclosing the first and second lenses; enlargement housing connected with the small tubular housing and having a viewing aperture penetrating through a viewing side; a magnifying lens disposed adjacent the entrance of the enlargement housing for magnifying the righted inverted view; a reflecting mirror disposed in the enlargement housing adjacent its second end for reflecting the magnified righted view; and a transparent viewing screen disposed adjacent the viewing aperture, allowing the magnified righted view to pass through and be reflected from the reflecting mirror and displaying the altered reflection with correct orientation. Also disclosed are specific embodiments, particularly one in which an orienting mount is employed on the reflecting mirror to facilitate orientation and recognition of correct image.

11 Claims, 3 Drawing Figures

U.S. Patent  Mar. 27, 1979  4,146,296

VIEWING APPARATUS EMPLOYING TRANSPARENT VIEWING SCREEN

BACKGROUND OF THE INVENTION

1. Field of the Invention

This invention relates to apparatus for viewing a predetermined sector via a correctly oriented, altered reflection. More particularly, the invention relates to a rear view reflecting system for moving vehicles such as automobiles and the like.

2. Description of the Prior Art

The prior art has seen the development of a wide variety of apparatus and means for viewing a sector, such as the rear of a moving vehicle. Primarily the apparatus of the prior art have employed one of two methods. In these methods the images are either projected images or reflected images. The projected images are dependent upon a bright illumination for transfer of the images since they lose so much light. Moreover, a darkened area around the final viewing screen is necessary since very little light effectively destroys the final image. With the simple reflection type image, the light is preserved but because of the use of the concave mirrors and the like, this produces an exaggerated, disoriented, or distorted picture of the objects in the field of view and also affords relatively limited field of view if distortion is to be within tolerable limits. Typical of the prior art types of apparatus are the following U.S. Pat. Nos.: 951,755 shows a car view box for street car or the like; 1,214,897 shows a tubular mirror system for an enclosed racing vehicle; 1,977,019 is one of the more pertinent patents showing a rear vision device for a vehicle having reflected images; 2,193,217 shows a relatively complicated system of interrelated mirrors and lenses to form a periscopic rear view device; 2,281,102 shows a rear vision device for a vehicle; 3,127,191 shows a periscopic rear view apparatus that views from the center rear of the vehicle by way of tubular enclosures.

U.S. Pat. No. 3,165,573 shows a screen type vision device using a projected image and usable for vehicles. U.S. Pat. No. 3,446,916 employs light fibers or the like to form a collimated viewing system on a partially reflecting film of parabolical shape or cathode ray tube type screen. U.S. Pat. No. 3,682,536 shows automotive vehicle side view periscope for looking sideways.

Two of the most pertinent patents are U.S. Pat. No. 2,501,067 showing a rear view mirror with image projecting periscopical facilities and U.S. Pat. No. 3,394,937 showing dual side slit rear view reflecting system.

Thus it can be seen that this art has become crowded art but that no totally satisfactory solution has been found that will provide a system presenting a correctly oriented view without substantial light diminishment and free of significant distortion.

SUMMARY OF THE INVENTION

Accordingly, it is an object of this invention to provide a system that allows viewing a predetermined sector by an altered reflection that alleviates the deficiencies of the prior art apparatus.

It is a specific object of this invention to provide a rearward viewing system employing an altered reflection type principle and allowing presenting a correctly oriented image without significant light diminishment and without significant distortion, even though altered for better viewing.

These and other objects will become apparent from the following descriptive matter, particularly when taken in conjunction with the appended drawings.

In accordance with this invention, there is provided a viewing system for viewing a predetermined sector, as by way of a first rear view mirror on the right hand side of a vehicle reflecting a first view of the predetermined sector to be surveyed; the system comprising a first lens for reducing and inverting the first view, the first lens being disposed in predetermined relationship with and having transparent, unobstructed line of sight to the first mirror. This allows employing a small tubular housing about the first lens and penetrating toward the viewer. The small tubular housing also encompasses adjacent its other end a second lens for righting the inverted first view, the second lens being disposed in a predetermined relationship with and having transparent, unobstructed line of sight to the first lens. An enlargement housing is connected with the smaller tubular housing at its end nearest the viewer. The enlargement housing has a viewing aperture penetrating through the viewing side closest to the viewer. A magnifying lens is disposed adjacent the entrance to the enlargement housing for magnifying the righted inverted first view; the magnifying lens being disposed in predetermined relationship with and having transparent unobstructed line of sight to the second lens. A second reflecting mirror is disposed in the enlargement housing adjacent its second end for reflecting the magnified, righted inverted first view. The second reflecting mirror is disposed in predetermined relationship with and has transparent unobstructed line of sight to the magnifying lens. A transparent viewing screen is disposed adjacent the viewing aperture in the enlargement housing, intermediate the magnifying lens and the second reflecting mirror. The transparent viewing screen is disposed at an angle so as to enable the viewer to see the second reflecting mirror and its altered reflection. The transparent viewing screen is adjustable in angle to allow fitting the viewing by way of the viewing aperture to the viewer. If desired, the small tubular housing and the enlargement housing can be made adjustable also. A well lighted altered reflection of the first view is presented to the viewer in proper proportions, with correct orientation, without significant distortion and without significant diminishment of light.

Preferably, an orienting border means, such as a colored mount with a light behind it, surrounds the second reflecting mirror to facilitate orientation and recognition of the correct image. If desired, an adjustment lens can be disposed in the small tubular housing intermediate the first and second lens and have handle means protruding exteriorly of the small tubular housing for fine adjustment of the altered reflection.

DESCRIPTION OF PREFERRED EMBODIMENTS

The viewing apparatus of this invention may be widely used for viewing a predetermined sector by an altered reflection method. Herein, however, it will be described with respect to presenting a first view from a rear view mirror on the right hand side of an automobile in order to bring that view into proximity to the driver. This bringing of a correctly oriented view closer to the driver is for convenience in obtaining an overall view of the relationship of driver's vehicle with respect to traffic, obstacles, and the like.

Figure 1:
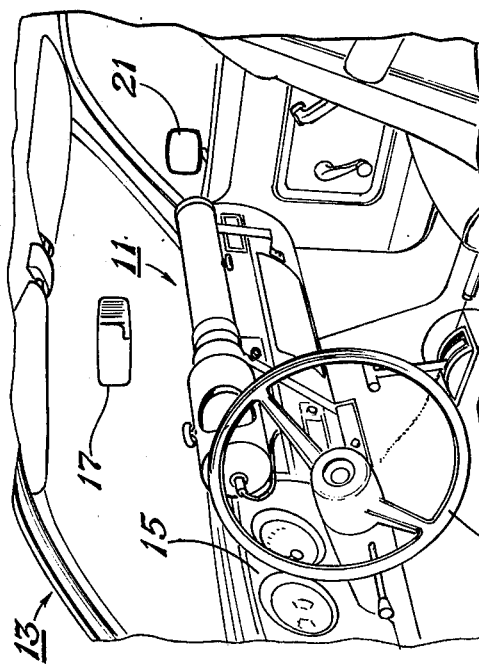
FIG. 1 is a perspective view of one embodiment of this invention installed in an automobile.

Referring to the drawings, and particularly FIG. 1, the viewing apparatus 11 is installed in a vehicle 13. The viewing apparatus of 11 is installed adjacent the dashboard 15 and immediately below the rear view mirror 17 for convenience of the driver in viewing all of the instruments and rear view mirrors with one movement of the eyes in the same general area without having to look off to the right. As is conventional, the automobile has a steering wheel 19 and a right hand rear view mirror 21, as well as gear shift 23 and the other usual accoutrements. The rear view mirror 21 on the right hand side enables viewing a conical shaped sector along the right side of the car, including a view of the right side of the vehicle for better perspective and feeling of interreltionship of obstacles, oncoming traffic and the like. If this view could be emplaced in front of the driver, it would be as useful as a left hand side rear view mirror that is close to the driver. Ordinarily, however, the right hand rear view mirror is so remote as to present a small, difficultly visible view that is marginally useful to the driver.

Figure 2:
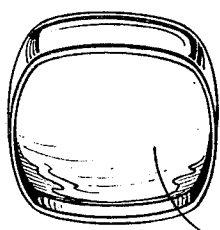
FIG. 2 is a cross sectional view of the embodiment of FIG. 1.
Figure 2:
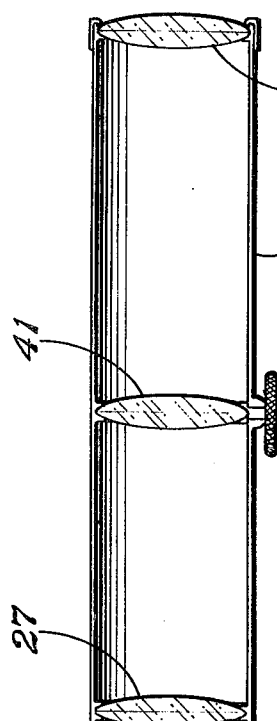
Figure 3:
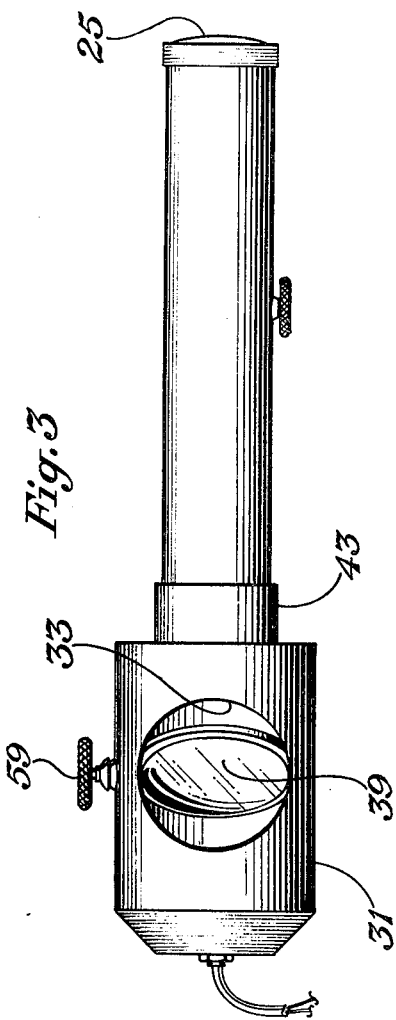
FIG. 3 is a side elevational view of the viewing apparatus of the embodiment of FIG. 1.

With the viewing apparatus of this invention, however, it can be brought to close viewing range for the driver and readily integrated into his visual survey of the instrument panel and the usual center mounted rear view mirror, as well as the closely mounted left hand side rear view mirror. Specifically, the viewing apparatus includes in addition to the first reflecting mirror 21 on the right hand side of the vehicle, a first lens 25, FIG. 2 for inverting and reducing the first view from the mirror 21 and a second lens 27 for righting the inverted first view. The apparatus 11 includes a small tubular housing 29 encompassing the first and second lenses 25 and 27. The apparatus 11 includes an enlargement housing 31 connected with the small tubular housing 29 and having a viewing apparatus 33, FIG. 3 penetrating through the viewing side, or forward side, with respect to a viewer. The apparatus 11 includes a magnifying lens 35 for magnifying the righted inverted first view; a second reflecting mirror 37; and a transparent viewing screen 39.

The rear view mirror 21 is provided for reflecting a first view of the predetermined sector along the right hand side of the automobile. It may comprise any of the conventional mirrors. Ordinarily, it is preferably a flat surfaced mirror that is large enough to provide a good comprehensive view of the sector to be surveyed. It may range from a conventional right hand side mirror for an automobile to the larger mirrors for trucks, pickups, campers and the like. Ordinarily it will comprise the usual glass with the mercury backing onto a black surface for more nearly perfect reflection. On the other hand, any of the reflectorized materials may be employed, such as reflectorized metals or the like. It should be disposed in position and with a good enough image to be picked up by the first lens 25.

The first lens 25 is provided for reducing and inverting the first view from the right hand mirror 21. The first lens 25 is disposed in predetermined relationship with the mirror 21, as in a straight line with the angled mirror so as to reduce and invert the image and yet allow it to be transposed laterally of the automobile, or toward the viewer. The first lens 25 must have a transparent unobstructed line of sight to the mirror 21. There may be an intervening object, such as a window, of the car or the like, as long as it is transparent and does not obstruct the transmission of light rays of the image. The first lens 25 may be a convex lens and the degree of convexity will depend upon its interrelationship with other lenses, distance to the second lens and the like. Expressed otherwise, its focal length will be chosen such that it allows the use of the small tubular housing; yet, allows the inverted, smaller image to be picked up and righted by the second lens 27.

The second lens 27 is provided for righting the inverted first view from the first lens 25. The second lens 27 is disposed in predetermined relationship with and has a transparent, unobstructed line of sight to the first lens 25 in order to allow the inverted first view to be projected and righted.

The first and second lenses may be formed of conventional transparent material like glass, plastic, pre-shaped liquid-filled envelopes, and the like that are employed for making conventional lenses. The respective focal lengths of the two lenses will be chosen so as to coact to project as nearly perfect an image as can be obtained, alone or in combination with an adjusting lens 41, as will be described later hereinafter.

The second lens 27 coacts with the first lens 25 and is of substantially the same size so as to be emplaced in a substantially uniform dimensioned tubular housing 29.

The small tubular housing 29 encloses the first and second lens. The tubular housing 29 may be of any desired cross sectional shape and formed of any suitable material. For example, the tubular housing may be square in cross sectional shape. As illustrated, the tubular housing 29 is circular in cross sectional shape such that it forms a substantially uniform cylindrical tubular housing to facilitate mounting of the circular lenses 25 and 27. The tubular housing 29 may be formed of metal; such as, aluminum, magnesium or steel; or of plastic, such as, thermoplastic materials like acrylonitrile butadiene styrene copolymer (ABS), polypropylene, polyvinyl chloride; or even cardboard, pressed board, or the like. The economical polyvinyl chloride pipe of suitable dimensions is eminently satisfactory. As illustrated, the first lens 25 is mounted by suitable means such as by adhesion, lens mounting ring, or the like near the first end of the tubular housing 29. The second lens 27 is similarly mounted adjacent the second end of the tubular housing 29. The adhesion may be by epoxy, mucilage, or other conventional adhesives such as the polyvinyl alcohol type glue. If desired, the tubular housing 29 may be in sections and threadedly joined together at the place where the lenses will be disposed to facilitate assembly. Suitable rubber mounts or the like may be employed within the threaded rings that receive the lenses to hold the lenses in place to prevent chipping, scratching, or other damage. The lenses and mountings should be good enough not to have chromatic or spherical aberrations. The second lens 27 may be mounted farther from the second end of the tubular housing 29 than the first lens 25 is from the first end and still have the desired altered reflected image reach the enlargement housing 31 and the magnifying lens 35.

Connected with the small tubular housing 29 at its second end is an enlargement housing 31. The enlargement housing allows magnifying the first view that has been inverted and then righted for presenting a larger altered image to the viewer, as well as making it closer to the viewer. As indicated hereinbefore, and if desired, the enlargement housing, as well as the smaller tubular housing 29, can be mounted so as to be rotated through several degrees to present the viewing aperture 33 in the best eye viewing relationship to the viewer. The enlargement housing 31 may be made from any of the conventional materials, similarly as described hereinbefore with respect to the small tubular housing 29. For example, it may be formed of the delineated or other metals or plastics or even cardboard or pressed board, as enumerated for the small tubular housing 29. The enlargement housing 31 may have any cross sectional shape; such as, square, octagonal, hexagonal, circular, or the like. As illustrated, it is circular in cross sectional shape so as to form a right circular cylinder. It is joined to the small tubular housing 29 by a collar 43 which may be affixed by set screws, or by bonding, either thermally (welding, soldering) or chemically (by glue or other adhesives). If desired, of course, the collar 43 may be threaded to threadedly engage threads on the small tubular housing 29 and facilitate assembly and disassembly. At least one end of the enlargement housing 31 is removable, as by threaded connection or the like, to allow installing the light 45, mirrors, transparent reflecting screen and magnifying lens 35.

Magnifying lens 35 is disposed adjacent the entrance of the enlargement housing for magnifying the righted first view. By the entrance is meant the end of the enlargement housing connected with the smaller tubular housing 29. The magnifying lens 35 is disposed in predetermined relationship with and has a transparent unobstructed line of sight to the second lens for receiving the image reflected therethrough. The magnifying lens 35 is a larger lens than the first or second lens and is employed for enlarging the altered reflection and focusing it onto the reflecting mirror 37. Necessarily, the light rays pass through the transparent viewing screen 39 in order to reach the mirror 37. The location of the magnifying lens 35 and its focal range will be chosen to obtain a clear picture and it will depend upon the distances between the respective lenses and mirrors, the degree of convexity of the second lens and of the magnifying lens and the degree of concavity of the reflecting mirror 37. The magnifying lens 35 is a high quality lens, similarly as are the first and second lenses 25 and 27, to keep down chromatic and spherical aberrations. The magnifying lens may be emplaced by the same means discussed hereinbefore with respect to the first and second lens; namely, a screw ring with or without a rubber or resilient mount, bonding, and the like. It is imperative, however, that it be maintained in its relatively fixed and predetermined relationship with respect to the second lens and to the reflecting mirror 37 in order to obtain consistently good images that do not vibrate with the vibration of the automobile or the like.

The reflecting mirror 37 is disposed in the enlargement housing adjacent its second end for reflecting the magnified first view that has been inverted and then righted. The reflecting mirror is disposed in predetermined relationship with and has transparent unobstructed line of sight to the magnifying lens. There may be transparent means such as the transparent viewing screen 39 interposed as long as light can be passed therethrough without significant reduction. The reflecting mirror 37 may have any form from the flat mirrors to the convex or concave, depending upon the image that is emplaced thereon from the respective sets of lenses. As illustrated, the reflecting mirror 37 is concave so as to present the largest possible view. The concavity is, however, uniform so as to resist significant distortion of the altered reflection. The reflecting mirror 37 may be affixed in the enlargement housing by any of the means such as described hereinbefore. For example, it may be affixed by a threaded ring, with or without a resilient padding, or by bonding or the like.

As illustrated, the reflecting mirror 37 is held in place by a mounting means 47. The mounting means 47 comprises a red border that is disposed at least at predetermined points around the reflecting mirror to facilitate orientation and correct image recognition. Specifically, the red border forming the mounting means 47 completely circles and is used to surround the reflecting mirror 37. The red border may be held in place by any of the suitable means, similarly as described hereinbefore. The red border is preferably at least translucent such that a light behind it can emphasize the outline of the mirror to facilitate the recognition.

In the preferred embodiment that has been illustrated, a light 45 is installed by suitable electrical socket 49 and electrical conductors 51 that are connected with a source of electricity and the usual switch and the like (not shown). As illustrated, light 45 is enclosed in an aperture 53 within an opaque end 55. If desired, the opaque end 55 may have a white interior for reflecting white light. In this way the translucent red ring can be seen more clearly in the transparent viewing screen 39. An end cap 56 may be affixed as by threads or being snapped over the end 55 to hold the light 45 in place.

The transparent viewing screen 39 is disposed adjacent the viewing aperture in the enlargement housing 31. The transparent viewing screen 39 is disposed intermediate the magnifying lens and the second reflecting mirror and disposed at an angle so as to enable a viewer to see through the viewing aperture, the reflection of the reflecting mirror 37 and its altered reflection. As illustrated, the transparent viewing screen comprises transparent planar, uniform quality plate glass that does not distort a reflection. Light silvering on one face gives a better image than a clear pane. The transparent viewing screen is mounted by way of a movable axis, or shaft, 57 and universal pivot mount 58 so as to allow adjusting its angle for best viewing by the viewer. The universal pivot mounting 58 comprises a ball joint that can be pivoted about a plurality of axes. A knob 59 is provided on the shaft portion of the fulcrum axis 57. The shaft is journalled for rotation but is frictionally gripped so as to hold any position in which it is set. If desired, tightening knobs or the like can be employed to hold a set position once it has been obtained.

If desired, a metallic mounting ring may hold the transparent viewing screen 39 in place and be affixed to partial shafts on either side that are in turn journalled for pivotal movement to obtain the desired angle and then frictionally gripped to hold the angle obtained.

In operation, the rear view mirrors are installed in the automobile and the viewing apparatus assembled as described hereinbefore. The viewer, or the driver of the car or the like, is seated behind the steering wheel 19.

The viewer then rotates the enlargement housing 31 and the smaller tubular housing 29 or adjust the transparent viewing screen 39 to get the viewing aperture or screen at the best viewing angle. As indicated hereinbefore, the knob 59 is turned to obtain the best altered reflection in the transparent viewing screen 39 to insure that the right hand rear view mirror 21 is surveying the desired sector including the reference points, such as the side of the vehicle. Thereafter, the driver has merely to glance into the transparent viewing screen through the viewing aperture 33 in a routine visual inspection that can include the instrument panel as well as the central and left hand rear view mirrors.

The following information shows a construction that has been developed through trial and error and found to give good results. The viewing apparatus 11 was aligned with the rear view mirror 21 and comprised the following:

a convex first lens 25 with a focal length of 7.5 inches (19 centimeters), a convex second lens 27 with a focal length of 10.5 inches (26.5 centimeters) mounted about 14 inches from the first lens, a small tubular housing about 1.5 inches (3.8 centimeters) in diameter a magnifying lens 35 with a focal length of 12 inches (30.5 centimeters) mounted about 10 inches (25.4 centimeters) from the second lens 27 and about 7 inches (17.7 centimeters) from the second reflecting mirror 37.

It is imperative that an odd number of reflections be employed to preserve the correct orientation in the view.

From the foregoing, it can be seen that this invention achieves the objects delineated hereinbefore. Specifically, this invention takes the reflected image from the back side of the rear view mirror and via respective lenses, transfers and alters and magnifies and the like, in such a way as to achieve a correctly oriented, clear view with regard to size and proportion shown by the outside car mirror. This is not a projection since there is very little light loss in the transference, or reflection. Specifically, the apparatus of this invention has the following features that are desirable and not heretofore achieved by the prior art. (1) The device affords a reproduced image that is true in both clarity, orientation, and proportion, close to the driver for viewing. (2) The apparatus functions at all times and is not dependent upon brilliant outside illumination of objects. (3) The device is easily and readily installed in or on any vehicle and affords a helpful driving aid. The use of the red border around the reflection mirror facilitates image recognition and orientation, particularly when a light is behind the red border.

Although the invention has been described with a certain degree of particularity, it is understood that the present disclosure is made only by way of example and that numerous changes in the details of construction and the combination and arrangement of parts may be resorted to without departing from the spirit and scope of the invention.

What is claimed is:

1. An altered reflection viewing system comprising:
   a. a first mirror for reflecting a first view of a predetermined sector to be surveyed;
   b. a first lens for reducing and inverting said first view; said first lens being disposed in predetermined relationship with and having transparent, unobstructed line of sight of said first mirror;
   c. a second lens for righting the inverted first view; said second lens being disposed in predetermined relationship with and having transparent, unobstructed line of sight to said first lens;
   d. small tubular housing enclosing said first and second lenses;
   e. enlargement housing connected with said small tubular housing; said enlargement housing having a viewing aperture penetrating through a viewing side thereof;
   f. a magnifying lens disposed adjacent the entrance of said enlargement housing for magnifying the righted inverted first view; said magnifying lens being disposed in predetermined relationship with and having transparent, unobstructed line of sight to said second lens;
   g. second reflecting mirror disposed in said enlargement housing and adjacent its second end for reflecting the magnified, righted inverted first view; said second reflecting mirror being disposed in predetermined relationship with and having transparent unobstructed line of sight to said magnifying lens;
   h. a transparent viewing screen disposed adjacent said viewing aperture in said enlargement housing, intermediate said magnifying lens and said second reflecting mirror, and disposed at an angle so as to enable a viewer to see a reflection of said second reflecting mirror and its altered reflection;

said transparent viewing screen being adjustable in angle to allow fitting the viewing to said viewer, such that a well lighted, correctly oriented, altered reflection of said first view is presented to said viewer in proper proportion without significant distortion and diminishment of light.

2. The viewing system of claim 1 wherein said second reflecting mirror is disposed within an orienting border means for facilitating recognition of correct image.

3. The viewing system of claim 2 wherein said orienting border means includes a colored mount at predetermined locations about said second reflecting mirror.

4. The viewing system of claim 3 wherein said colored mount surround said second reflecting mirror and a light is disposed between said second reflecting mirror and said second end of said enlargement housing to enhance said border orienting.

5. The viewing system of claim 1 wherein an adjustment lens is disposed in said small tubular housing intermediate said first lens and said second lens; said adjustment lens having means protruding exteriorly of said adjustment lens having means protruding exteriorly of said small tubular housing for fine adjustment of the altered reflection.

6. The viewing system of claim 1 wherein said small tubular housing and said enlargement housing are adjustably rotatable for optimum viewing.

7. Apparatus for viewing a predetermined area such as a mirror reflecting a view of a predetermined sector, via an altered reflection comprising:
   a. a first lens for reducing and inverting the first view, said first lens being disposed at a first location in fixed relationship with and having transparent unobstructed line of sight to the first view;
   b. a second lens for righting the inverted first view; such second lens being disposed in predetermined relationship with and having transparent, unobstructed line of sight to said first lens;

c. small tubular housing enclosing said first and second lenses;

d. enlargement housing connected with said small tubular housing; said enlargement housing having a viewing aperture penetrating through a viewing side thereof;

e. a magnifying lens disposed adjacent the entrance of said enlargement housing at its first end for magnifying the righted inverted first view; said magnifying lens being disposed in predetermined relationship with and having transparent, unobstructed line of sight to said first lens;

f. a reflecting mirror disposed in said enlargement housing adjacent its second end for reflecting the magnified, righted, inverted first view; said reflecting mirror being disposed a predetermined relationship with and having transparent, unobstructed line of sight to said magnifying lens;

g. a transparent viewing screen disposed adjacent said viewing aperture in said enlargement housing, intermediate said magnifying lens and said reflecting mirror, and disposed at an angle so as to enable a viewer to see a reflection of said second reflection mirror and its altered reflection;

said transparent viewing screen being adjustable in angle to allow fitting the viewing to said viewer such that a well lighted altered, correctly oriented, reflection of said first view is presented to said viewer in proper proportion without significant distortion and diminishment of light.

8. The apparatus of claim 7 wherein said reflecting mirror is disposed within an orienting border means for facilitating recognition of correct image.

9. The apparatus of 8 wherein said orienting border means includes a colored mount that surrounds said reflecting mirror and a light is disposed between said reflecting mirror and said second end of said enlargement housing to enhance said orienting border means.

10. The apparatus of claim 7 wherein an adjustment lens is disposed in said small tubular housing intermediate said first lens and said second lens; said adjustment lens having means protruding exteriorly of said small tubular housing for fine adjustment of the altered reflection.

11. The apparatus of claim 7 wherein said small tubular housing and said enlargement housing are adjustably rotatable for optimum viewing.

* * * * *